Oct. 14, 1958  B. WALKER  2,856,199
ADJUSTABLE PNEUMATIC AUXILIARY SUSPENSION FOR VEHICLE
Filed Dec. 15, 1955

INVENTOR.
Brooks Walker

United States Patent Office 2,856,199
Patented Oct. 14, 1958

2,856,199

ADJUSTABLE PNEUMATIC AUXILIARY SUSPENSION FOR VEHICLE

Brooks Walker, Piedmont, Calif.

Application December 15, 1955, Serial No. 553,222

10 Claims. (Cl. 280—124)

This invention pertains to auxiliary vehicle suspensions, and particularly to auxiliary vehicle suspensions that employ the compressibility of the spare tire or a pneumatic tire carried at the rear of the vehicle to provide the auxiliary support.

This invention relates particularly to vehicles in which the spare tire is carried transversely of the vehicle and in back of the rear axle in a more or less vertical position and bears against one or more support rods which are pivoted at one end to the vehicle rear axle or the mechanism on which the rear wheels rotate and the other end of the support rod is pivoted to the frame so that the point where the support rods or their associated shoe bear against the spare tire or pneumatic tire will have a reduced motion compared to the motion of the rear axle relative to the vehicle frame. This is desirable as the rear axle or mechanism on which the rear wheels rotate normally has a motion of about 8 to 11 inches total up and down motion, whereas the compressibility of one side of a spare tire or pneumatic tire should probably be kept at considerably less than half of that motion.

In this invention the spare tire is carried on a crank arm pivoted at one side of the vehicle body or frame and raised or lowered by a hydraulic cylinder located at the opposite side of the vehicle. When the spare tire is raised it may act only as an auxiliary bumper when the pads on the support rods move upwards to near the point where the axle would hit the rubber bumpers under the frame. The normal weight of the vehicle when lightly loaded is to be carried through the regular springs, which can be of the leaf, coil, torsion bar, air, etc. type of any conventional manner, and the auxiliary support is provided through the spare tire by raising or lowering the spare tire. When more auxiliary support is needed, oil is introduced into the control cylinder for the crank on which the spare is mounted and the spare is lowered so as to provide more support through the support rods. As the spare tire is lowered to its lowermost position the maximum amount of overload will be provided. The shape of the shoe on the support rods which bears against the lower portion of the spare can be so shaped as to give the characteristic increase in supporting rate per inch of axle travel that is most desirable. A large clearance volume in the spare tire compared to the portion being compressed will prevent the pressure in the tire from rising too rapidly as might be the case with a small closed bag without auxiliary clearance volume. Operation of the hydraulic cylinder may be from an engine driven pump, such as a power steering pump, as shown in my co-pending application, Ser. No. 343,110, now abandoned, or from a pump, reservoir, control valve unit 32 mounted between the axle and the frame 10, as shown in my co-pending application, Ser. No. 459,441, or by operator foot pump, as shown in my application Ser. No. 394,244, or any other suitable means.

The spare tire may rest in a well which has a boot bottom with the shoe on the support rods bearing against the boot so as to provide dust and water seal to the luggage in a manner as shown in my co-pending application, Ser. No. 546,421. The spare tire is mounted by one or more of the usual mounting bolts to an extension of the crank which controls its up and down position, and the spare can be used as a spare tire by releasing the hydraulic loading so that the tire does not act as an overload; using this tire to replace the one that has gone flat and then carrying the flat tire where the overload spare was carried. In this instance, no auxiliary support could be provided through the flat tire until it could be repaired but the vehicle can be operated through its normal support springs.

Other features of the invention will be more particularly pointed out in the accompanying claims, and specification.

I have illustrated my invention by way of example in the accompanying drawings.

In all figures like numerals of reference refer to the corresponding parts.

Figure 1:
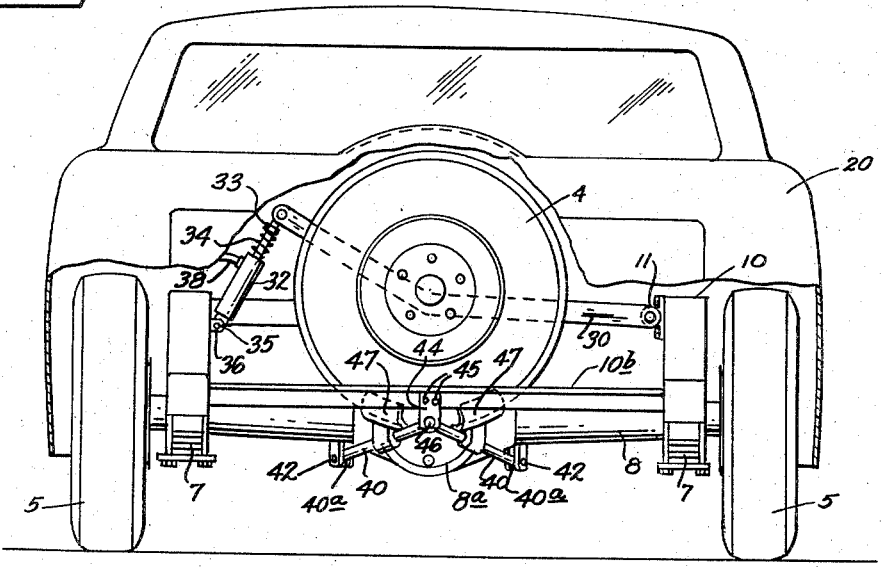
Fig. 1 is a rear elevation, partly cut away, showing one form of the invention, as applied to a vehicle.
Figure 2:
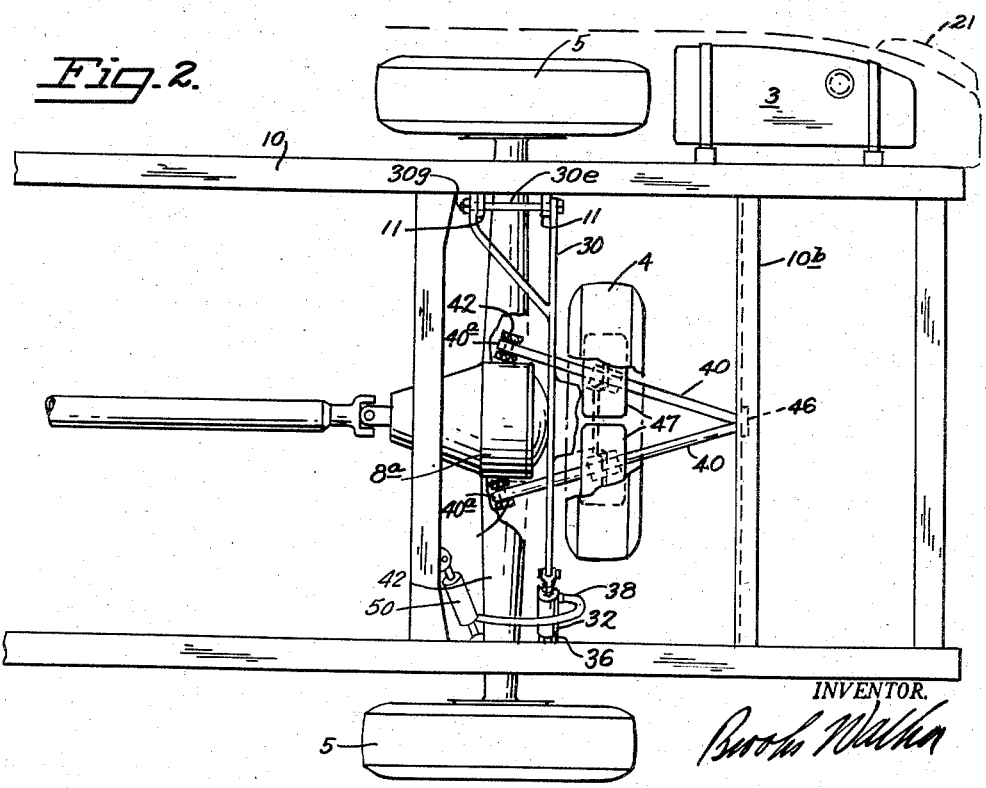
Fig. 2 is a plan view of the rear portion of a vehicle, as shown in Fig. 1, partly cut away and with the body removed.

In Figs. 1 and 2 I have shown a vehicle having a body 20 and a rear bumper 21. A fuel tank 3 may be located back of one of the rear wheels 5. The body is supported by frame 10. Frame 10 is supported on wheels 5 through leaf springs 7 in a conventional manner. Rear axle 8 is the mechanism on which the wheels rotate. It has a differential 8a located near its center and on each side is a pivot bolt 42 which goes through a ring end 40a in the forward end of support rods 40. Support rods 40 have a shoe 47 that rides on the lower portion of the spare tire 4. The rear end of support rods 40 is fastened to a flexible link 44 by bolt 46. The upper end of flexible link 44 is secured to cross member 10b of frame 10 by bolts 45. This flexible link may be of the rubber and fabric type, similar to that used in supporting exhaust pipes. The spare tire supporting arm 30 is pivoted at bearings 11 and retained by volt 30e and nut 30g at the forward end of bearings 11. Bearings 11 are secured to frame 10 by any suitable means. Cylinder 32 is secured to frame 10 by bracket 36 and pin 35. Spring 34 may be used to force piston rod 33, support arm 30, and spare tire 4 to their upermost position. Pipe 38 leading to the top of cylinder 32 admits liquid to the top of the cylinder to retract piston rod 33, lower crank arm 30, and associated spare tire 4 to bear more heavily on shoe 47 and support arms 40 to provide an increasing, yieldable overload support. The more lower spare tire 4 is lowered the more auxiliary support will be provided through support arm 40. The stability of the spare tire tread with the spare 4 locked from rotation will tend to provide increased lateral stability for rear axle 8 while moving vertically up and down against a fixed position of the wheel of spare tire 4. Spare tire 4 may be pivoted to arm 30 if desired. Spare tire 4 is held in a central position by arm 30 as shown, with its axis of rotation (when mounted for normal vehicle supporting) falling in the central longitudinal plane of the vehicle. Cylinder 32 may be controlled by reservoir pump height control valve unit 50 as described in detail in my co-pending application, Ser. No. 459,441, to lower the spare tire automatically when carrying a heavy load and raising the spare tire to lighten the auxiliary support when carrying a lighter load to try to maintain the body of the vehicle at substantially the same height from the roadway. Other features of the invention will be more particularly pointed out in the accompanying claims.

To those skilled in the art to which this invention relates, many changes in construction and widely differ-

I claim as my invention:

1. A vehicle having a body, rear supporting wheels, a structure on which said wheels rotate, resilient means between said body and said structure for supporting part of the weight of said body, a tire carried rearwardly of said structure, auxiliary resilient support means between said structure and said body, said auxiliary means including the compressibility of said tire when the rear of said vehicle is supported on said rear wheels, a mechanical linkage from said structure to the exterior of said tire to transmit resistance to compression of said tire into auxiliary vehicle support, said tire being inflated and mounted transversely of said vehicle and back of said mechanism, said tire being movable vertically to vary the degree of auxiliary vehicle support, said tire being mounted on an arm which is pivoted to said body at one side near one of said rear wheels, a fluid cylinder, said fluid cylinder secured at one end to said body and at the other to said arm to move said tire vertically.

2. The vehicle of claim 1, in which there is an automatic means for varying said auxiliary support to maintain the rear of said vehicle body at substantially the same height above the ground while operating with different loads while traversing smoother roads.

3. The vehicle of claim 1, in which there is a means for automatically lowering said tire to increase said auxiliary support when more load is carried by said vehicle than when a lighter load is carried by said vehicle.

4. The vehicle of claim 3, in which said automatic means raises said tire when a reduced load is carried by said vehicle compared to the position of said tire when the heavier load is carried.

5. In a vehicle having a frame, rear supporting wheels, a structure on which said wheels rotate, resilient means between said frame and said structure for supporting part of the weight of said frame, the combination therewith of an arm pivoted to said frame at one side; a closed compressible inflated pneumatic container mounted on said arm rearwardly of said structure and transversely of said vehicle; a fluid cylinder secured at one end to said frame and at the other to said arm to swing said arm and thereby move said container; a mechanical linkage from said structure to the exterior of said container to transmit resistance to compression of said container into auxiliary vehicle support, the movement of said container by said fluid cylinder serving to vary the degree of auxiliary vehicle support.

6. The combination of claim 5 with automatic means for actuating said fluid cylinder to vary the degree of said auxiliary support and for maintaining the rear of said frame at substantially the same height above the ground wheels operating with different loads.

7. The combination of claim 5 wherein there is automatic means for lowering said container to increase said auxiliary support when load is added to said vehicle frame.

8. The combination of claim 7 wherein said automatic means raises said container and decreases the auxiliary support when the load on said frame is reduced.

9. In a vehicle having a frame, rear supporting wheels, a structure on which said wheels rotate, and resilient means between said frame and said structure for supporting part of the weight of said frame, the combination therewith of an arm pivoted at one end to said frame; an inflated pneumatic tire mounted vertically on said arm rearwardly of said structure and transversely of said vehicle; a fluid cylinder secured at one end to said frame and at the other to said arm to swing said arm and thereby move said tire vertically; and auxiliary resilient support means between said structure and said frame, said auxiliary means including the compressibility of said tire when the rear of said vehicle is supported on said rear wheels and a mechanical linkage from said structure to the exterior of said tire to transmit resistance to compression of said tire into auxiliary vehicle support, the vertical movement of said tire by said fluid cylinder serving to vary the degree of auxiliary vehicle support.

10. In a vehicle having a frame, rear supporting wheels, a structure on which said wheels rotate, and resilient means between said frame and said structure for supporting part of the weight of said frame, the combination therewith of an inflated pneumatic tire mounted rearwardly of said structure, transversely of said vehicle, and movably with respect to said frame; means secured at one end to said frame for moving said tire relative thereto; and a mechanical linkage from said structure to the exterior of said tire to transmit resistance to compression of said tire into auxiliary vehicle support, the movement of said tire by said means serving to vary the degree of auxiliary vehicle support.

References Cited in the file of this patent

UNITED STATES PATENTS

| | | |
|---|---|---|
| 1,630,062 | Fay | May 24, 1927 |
| 1,642,946 | Fay | Sept. 20, 1927 |
| 2,755,099 | Smith | July 16, 1956 |
| 2,762,633 | Gouirand | Sept. 11, 1956 |